United States Patent [19]

Kinoshita et al.

[11] Patent Number: 5,407,750
[45] Date of Patent: Apr. 18, 1995

[54] HIGH PURITY DENSE SILICON CARBIDE SINTERED BODY AND PROCESS FOR MAKING SAME

[75] Inventors: Toshiya Kinoshita; Hiroshi Kubo, both of Kawasaki, Japan

[73] Assignee: Nippon Steel Corporation, Tokyo, Japan

[21] Appl. No.: 995,642

[22] Filed: Dec. 18, 1992

[30] Foreign Application Priority Data

Dec. 19, 1991 [JP] Japan ................... 3-353901
Feb. 28, 1992 [JP] Japan ................... 4-075766

[51] Int. Cl.⁶ .............................................. B32B 15/04
[52] U.S. Cl. ......................................... 428/450; 75/236; 501/89; 423/345; 419/17; 419/48; 264/56; 428/912.2
[58] Field of Search .............. 75/236; 501/89; 423/345; 419/17, 48; 264/56; 428/450, 912.2

[56] References Cited

U.S. PATENT DOCUMENTS

| | | | |
|---|---|---|---|
| 3,836,673 | 9/1974 | Weaver et al. | 423/345 |
| 4,135,937 | 1/1979 | Murata et al. | 106/44 |
| 4,214,818 | 7/1980 | Choyke et al. | 350/310 |
| 4,230,497 | 10/1980 | Schwetz et al. | 106/44 |
| 4,332,755 | 6/1982 | Murata | 264/65 |
| 4,354,991 | 10/1982 | Suzuki et al. | 264/65 |
| 4,467,043 | 8/1984 | Kriegesmann et al. | 501/88 |
| 4,659,548 | 4/1987 | Gubbay et al. | 419/10 |
| 4,814,232 | 3/1989 | Bluege et al. | 428/450 |
| 5,075,264 | 12/1991 | Kinugara et al. | 501/88 |

FOREIGN PATENT DOCUMENTS

| | | |
|---|---|---|
| 49-7311 | 1/1974 | Japan. |
| 57-41538 | 3/1982 | Japan. |
| 60-34515 | 8/1985 | Japan. |
| 63-21251 | 1/1988 | Japan. |

OTHER PUBLICATIONS

J. of the American Ceramics Society, vol. 39, No. 11, Dec. 1956, pp. 386-389, "Pressure Sintered Silicon Carbide", R. A. Allegro et al.

Primary Examiner—Ngoclan T. Mai
Attorney, Agent, or Firm—Kenyon & Kenyon

[57] ABSTRACT

A high purity and high density silicon carbide sintered body is made by controlling an amount of aluminum in an aluminum compound as a sintering additive from more than the solid solution upper limit in silicon carbide, preferably, as aluminum from 0.4 to 0.7% by weight of the total silicon carbide and aluminum compound. The sintered body has a density of 99.9% or more and can have a smooth surface with an average surface roughness of 2 nm or less when polished. Thus, this sintered body is suitable for producing a precise, rigid and heat resistant mirror substrate.

10 Claims, 5 Drawing Sheets

HIGH PURITY DENSE SILICON CARBIDE SINTERED BODY AND PROCESS FOR MAKING SAME

BACKGROUND OF THE INVENTION

1. Field of the Invention

The present invention relates to a high purity dense silicon carbide sintered body, a reflection mirror made by polishing the silicon carbide sintered body and processes for making the same. The reflection mirror or a substrate thereof of the present invention is useful as a reflection mirror or a substrate thereof for X rays, laser beams, etc. and can be utilized in various optical devices and so forth.

2. Description of the Related Art

Reflection mirrors of X rays or laser beams are widely used and metal or glass substrates have been conventionally used for such reflection mirrors.

However, as a result of developments in technology, a high optical source output, high speed beam scanning and so on are required and good heat resistance and high elastic modulus are characteristics required of reflection mirrors.

Conventional metal substrates have a relatively rough surface and the reflection of a short wavelength ray is therefore low so that metal substrates cannot be utilized in a mirror for a light having a wavelength shorter than that of visible light or an electromagnetic wave. Further, since metal is not highly rigid but is dense, it is difficult for a metal substrate mirror to be made with precision and light in weight.

Glass substrates have poor thermal conduction and therefore cannot be used in connection with a high power beam since the glass will deform by the heat from a high power beam. Also, glass substrate mirrors cannot be made with precision because glass is not rigid.

In contrast, ceramic sintered bodies are desirable materials for the above mentioned requisites owing to good heat resistance and rigidity, but are difficult to apply to reflection mirrors because conventional ceramics have a high degree of surface roughness. Among other ceramic sintered bodies, silicon carbide sintered bodies are considered suitable for application to a reflection mirror as they are easily machined and they maintain stability when exposed to X rays, etc.

Silicon carbide, however, is difficult to sinter without sintering additives since silicon carbide is highly covalent. Accordingly, the following processes for sintering silicon carbide with sintering additives are known: The solid sintering method using the addition of both boron and carbon, as disclosed in Japanese Unexamined Patent Publication (Kokai No. 49-7311, published in 1974; and the liquid sintering method using the addition of aluminum oxide, as disclosed by R. A. Alliegro et al. in Journal of the American Ceramic Society, Vol. 39, P. 386, 1956.

Nevertheless, silicon carbide sintered bodies produced by the solid sintering method have insufficient density and cannot be utilized as a mirror substrate, which requires a density close to the theroretical density.

In contrast, it is said that the liquid sintering method may provide sintered bodies having a density close to the theoretical density. Silicon carbide sintered bodies obtained by the liquid sintering method are disclosed in, for example, the above Allingr's paper, Japanese Examined Patent Publication (Kokoku) Nos. 57-4153 and 60-34515 and Japanese Unexamined Patent Publication (Kokai) No. 63-21251.

Nevertheless, these silicon carbide bodies are intended to be used as a structural material and therefore contain aluminum compound particles due to the sintering additives or tungsten carbide particles, etc. due to the process in the sintered bodies, which cannot be used as a mirror substrate of a high purity dense silicon carbide sintered body.

SUMMARY OF THE INVENTION

The object of the present invention is to provide a high purity dense silicon carbide sintered body, a mirror substrate and a mirror using the silicon carbide sintered body and processes for producing the above.

In accordance with the present invention, there is provided a silicon carbide sintered body essentially consisting of silicon carbide and aluminum or an aluminum compound and containing aluminum or an aluminum compound in an amount calculated as aluminum more than the upper limit of aluminum or aluminum compound solid soluble in silicon carbide and not more than 1.00% by weight of the total weight of silicon carbide and aluminum or aluminum compound.

By polishing a surface of the above silicon carbide sintered body to an average surface roughness of not more than 2 nm, the sintered body can be advantageously used as a mirror substrate and thus a reflection mirror comprising the silicon carbide sintered body with a surface of not more than 2 nm in average surface roughness and a reflecting coating layer made on the surface is also provided.

In accordance with the present invention, there is also provided a process for producing a silicon carbide sintered body, comprising preparing a powder mixture of silicon carbide and aluminum or an aluminum compound; said aluminum or aluminum compound being in an amount of the limit of solid solution as aluminum to 1.00% by weight of the total silicon carbide and aluminum or aluminum compound, provided such that said aluminum or aluminum compound is calculated as aluminum, and hot pressing said powder mixture in an inert atmosphere at a temperature in a range of 1800° to 2100° C. at a pressure of not less than 10 MPa to obtain a sintered body.

DESCRIPTION OF THE PREFERRED EMBODIMENTS

Without a sintering additive of an aluminum compound, a silicon carbide sintered body cannot have a high density and, if the density of the sintered body is not close to the theoretical density, the sintered body has many pores and therefore cannot be used as a mirror substrate. Accordingly, an aluminum compound as a sintering additive is essential to make a mirror substrate of a silicon carbide sintered body but the added aluminum compound may also produce a rough surface on the sintered body. Since aluminum compound particles are more easily polished than silicon carbide particles, the surface of a silicon carbide sintered body becomes rough when polished. Also, since coagulated aluminum compound particles, if present, have a thermal expansion coefficient different from that of silicon carbide and the bonds between the coagulated aluminum compound particles and the silicon carbide particles become weak, the coagulated aluminum compound particles may drop off the surface of the sintered body when polished, resulting in a rough surface.

As shown later, we found that the aluminum compound as a sintering additive is necessary in an amount more than the upper limit of a solid solution in silicon carbide but an amount only slightly more than the above upper limit is sufficient to obtain a dense sintered body and, accordingly, the presence of aluminum or aluminum compound particles in a dense silicon carbide sintered body can be prevented by using a limited amount of an aluminum compound as a sintering additive.

Thus, the amount of aluminum or an aluminum compound to be added is more than the upper limit of aluminum or aluminum compound soluble in silicon carbide, and not more than 1% by weight of the total silicon carbide and aluminum or aluminum compound. If the amount of aluminum or aluminum compound is not more than the solid soluble limit, an obtainable silicon carbide sintered body has a density of only up to 90% TD (theoretical density) and cannot be used as a mirror substrate. If the amount of aluminum or aluminum compound is more than 1% by weight, aluminum compound particles are deposited or formed in a silicon carbide sintered body and a surface of the silicon carbide sintered body will have an average surface roughness of more than 2 nm when polished. Also, the thermal conduction coefficient of the sintered body is disadvantageously lowered with an increase of the amount of aluminum or aluminum compound.

The amount of aluminum or aluminum compound is calculated as the weight of aluminum element based on the total weight of silicon carbide and aluminum or aluminum compound. The amount of aluminum or aluminum compound is generally more than 0.25–0.60 to 1.00% by weight, preferably 0.35 to 0.70% by weight while the precise amount depends on the system.

When the amount of aluminum or aluminum compound is selected in the above range, the obtained silicon carbide body can have a density of not less than 99.5% of the theoretical density, preferably not less than 99.9% and does not have pores, which are disadvantageous. Furthermore, the added aluminum or aluminum compound does not exist as particles of aluminum or aluminum compound; the particles typically having a particle size of 0.5 $\mu$m to several tens of $\mu$m in the sintered body, and exist only at triple points (three particle interface) typically having a size of not more than 0.2 $\mu$m, preferably not more than 0.1 $\mu$m. It should be noted that the term "particles" is distinguished from the term "triple points" in the specification. The presence of the triple points is not a problem because the polishing is at present carried out with diamond abrasive powders having a particle size in the order of about 0.5 $\mu$m.

When the silicon carbide sintered body obtained as above is polished, the polished surface of the sintered body can have an average surface roughness Ra of not more than 2 nm. If the average surface roughness Ra of the surface of the sintered body is more than 2 nm, the sintered body with a reflecting coating does not provide sufficient light reflection. Preferably the sintered body should have a reflecting surface with an average surface roughness Ra of not more than 1 nm.

The production of a silicon carbide sintered body is effected as below.

The silicon carbide powders and aluminum or aluminum compound powders as the starting material are not particularly limited and may be any commercially available powders, but the silicon carbide powders desirably have an average particle size of not more than 0.5 $\mu$m to enhance sinterability.

The aluminum compound may be, for example, aluminum oxide, aluminum nitride, aluminum carbide, aluminum silicide, alumina zol, beomite, etc.

The starting material, i.e., the silicon carbide powders and the aluminum or aluminum compound powders are mixed. The amount of aluminum or aluminum compound is as described above, i.e., more than the solid soluble upper limit and not more than 1% by weight as aluminum.

The powder mixture is sintered by hot pressing in an inert atmosphere, for example, an argon atmosphere, at temperature in a range of not less than 1800° C., typically 1800° C. to 2100° C., preferably 1900° C. to 2050° C., at a pressure of not less than 10 MPa. The temperature of not less than 1800° C. is necessary to obtain a sufficient density. If the temperature is over 2100° C., the silicon carbide tends to decompose and the density of the sintered body is lowered. The pressure of not less than 10 MPa is necessary to enhance the sintering. The upper limit of the pressure will depend on the strength of a mold. At a temperature of about 2000° C., graphite or carbon-carbon composite molds are usually used for hot pressing and about 100 MPa is the upper limit of the pressure for such molds.

The polishing of the obtained silicon carbide sintered body may be carried out, for example, with diamond abrasive powders in a lap. The final diamond abrasive powder used preferably have a particle size of about ¼ $\mu$m. Thus, a mirror polished surface of a silicon carbide sintered body is obtained and the polished surface has an average surface roughness of not more than 2 nm, preferably not more than 1 nm.

A reflection coating is applied to the polished surface of the sintered body. The reflection coating may be made of gold, silver, platinum, aluminum, and so on and the coating can be made, for example, by evaporation, sputtering, CVD, etc.

Thus, a mirror of a silicon carbide body that has a smooth and excellent reflecting surface, is light in weight, heat resistant, rigid, durable and can be machined with precision can be obtained.

The relationships between the amount of aluminum or aluminum compound and the sintering of silicon carbide are described more in detail.

The inventors found and confirmed by conducting precise experiments that aluminum other than aluminum solid dissolved in silicon carbide particles is effective for densifying silicon carbide during sintering. Namely, when excess aluminum that cannot be solid solved in silicon carbide particles remains on the grain boundaries and forms a liquid phase by reacting with silicon oxide present on surfaces of the silicon carbide particles, in and from which silicon carbide is fused and redeposited, and the sintering of the silicon carbide progresses.

Figure 1:
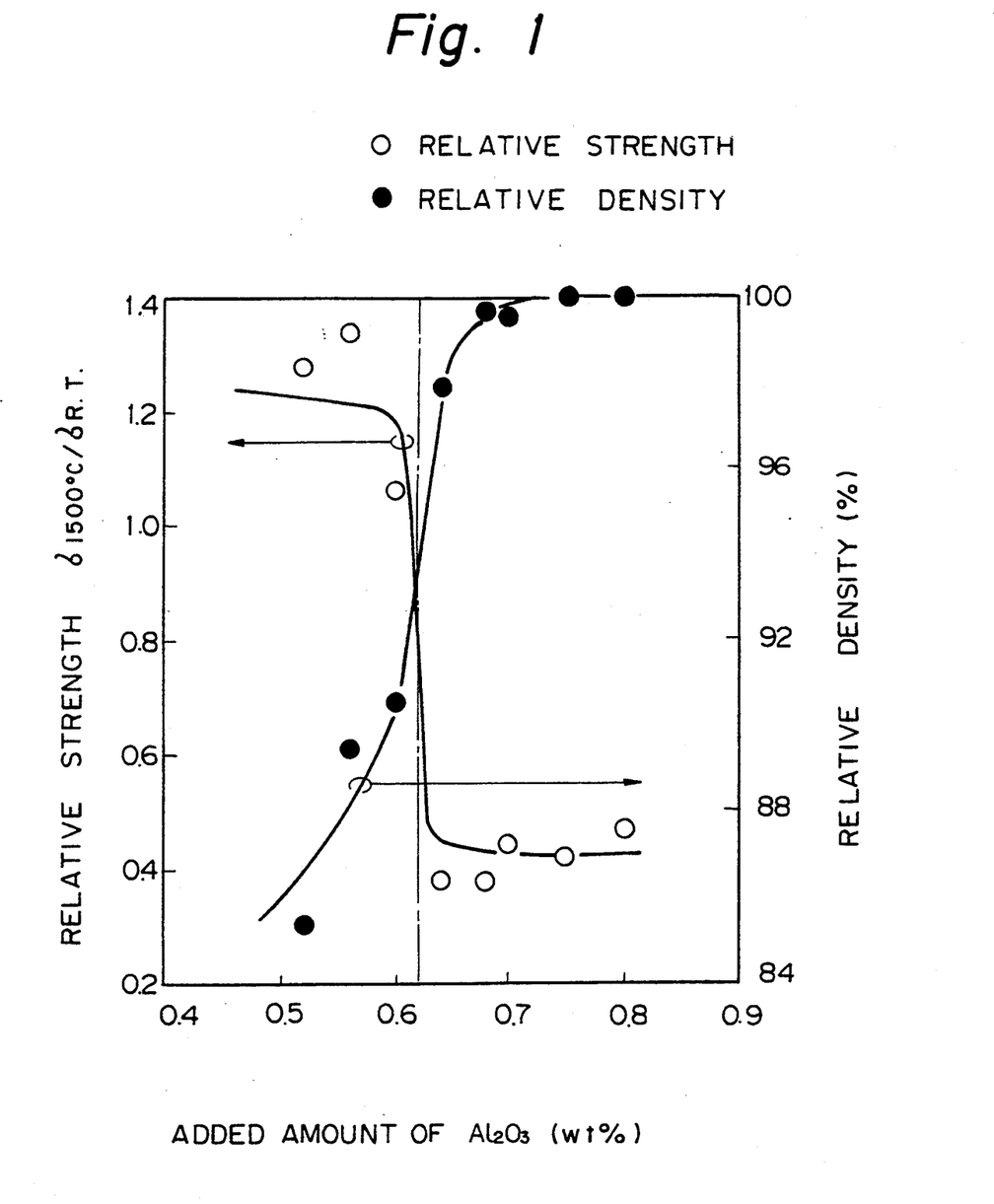
FIGS. 1 and 2 show the relationships of the properties of a silicon carbide sintered body with the amount of added alumina in the Examples.
Figure 2:
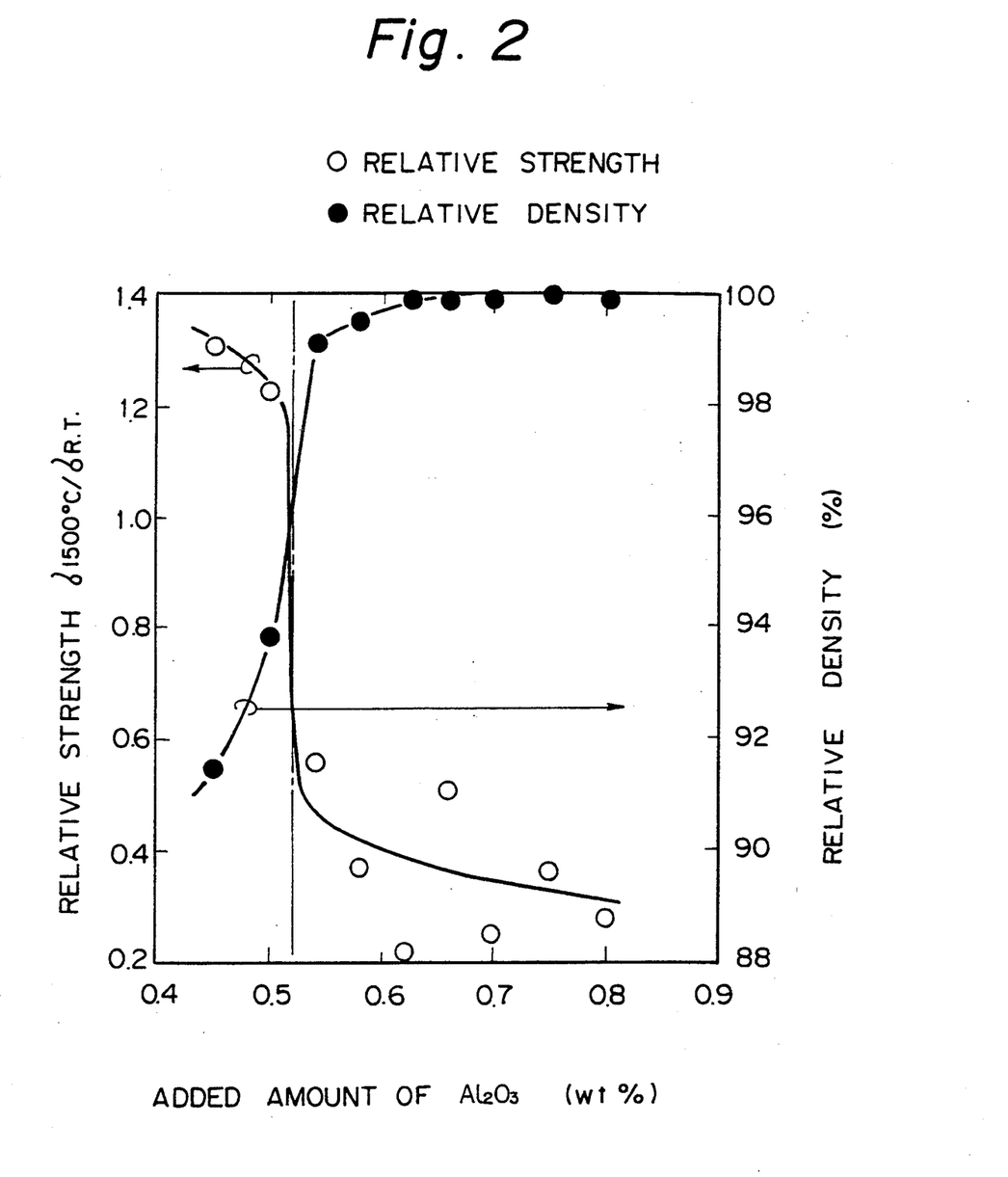

The relative strength of a silicon carbide sintered body at 1500° C. and at room temperature was examined while the content of alumina varied. The result is shown in FIG. 1. If alumina exists in grain boundaries, the grain boundary phase will be soften at 1500° C. and the strength of the body will be lowered. As seen in FIG. 1, around a certain content of alumina, the relative strength of the body is abruptly lowered and, in contrast, the density of the body increases abruptly. This clearly shows that the above certain content of alumina corresponds to the upper limit of the solid soluble alumina in silicon carbide.

In conventional silicon carbide sintered bodies made for structural purposes, since mechanical strength and toughness are required, only the densification of the sintered bodies is considered and an excess amount of an aluminum compound is added. As a result, the obtained silicon carbide sintered bodies are such that they cannot be utilized as a mirror substrate by polishing a surface thereof since the polishing produces a rough surface.

In accordance with the present invention, the solid solution limit of aluminum or an aluminum compound in silicon carbide has been examined with precision and the remaining aluminum content in the silicon carbide sintered body is lowered and, as a result, a dense silicon carbide sintered body that does not contain aluminum or aluminum compound particles is obtained and therefore can provide a mirror substrate with a sufficiently smooth surface.

Figure 3A:
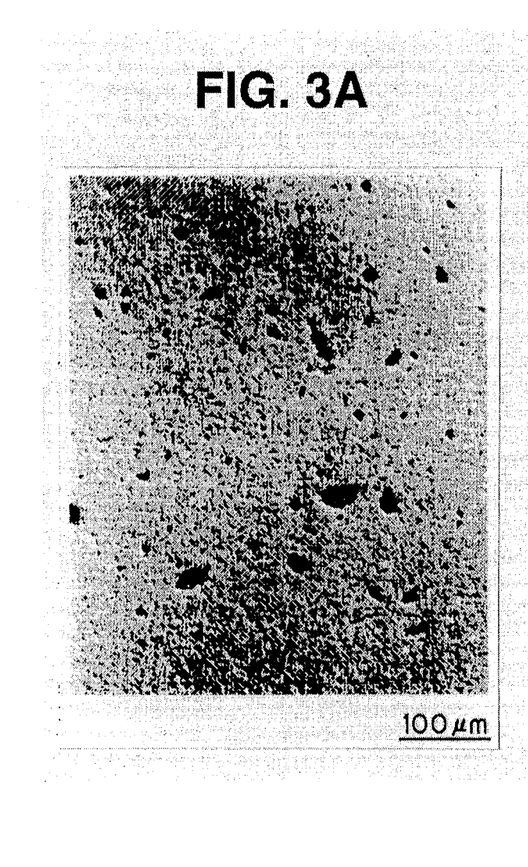
FIGS. 3(a) and (b) shows a change in the microstructure of a sintered body taken by differential interference contrast observation ($\times 400$)
Figure 3B:
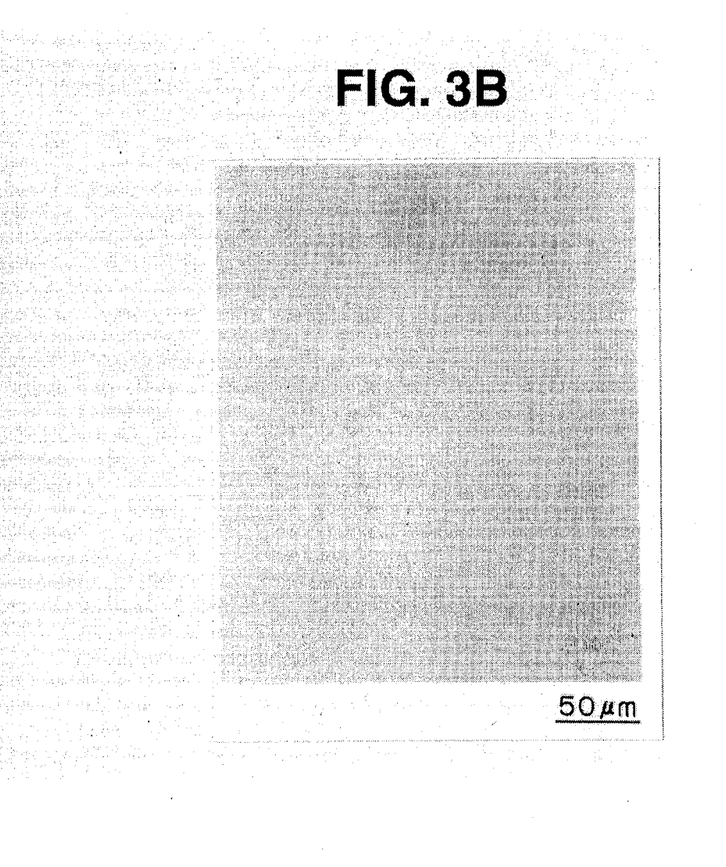
FIG. 3(b) shows the resulting microstructure after controlling the amount of $Al_2O_3$ added and the disappearance of the remaining $Al_2O_3$ particles.

FIG. 3 shows photographs of silicon carbide sintered bodies containing an aluminum compound, in the prior art ((a); left side) and of the present invention ((b); right side), taken by a differential interference contrast observation (×400).

In FIG. 3, the black portions seen in the conventional sintered body are aluminum compound particles. In the sintered body of the present invention, no aluminum compound particles are found in the differential interference microscope photograph at a magnitude of 400.

Also, the sintered body of the present invention was examined by transmission election microscopy (FIG. 4) and element analysis (FIG. 5) and it was found that aluminum other than that solid solved in silicon carbide particles is present together with impurities of the starting material at triple points of the sintered body. Nevertheless, the triple points have a size of about 0.1 μm and do not affect the surface roughness at the present.

EXAMPLES

Example 1

Silicon carbide powders having an average particle size of 0.3 μm and aluminum oxide powders having an average particle size of 0.3 μm were mixed in compositions as shown in Table 1, and milled in a ball mill of silicon carbide for 24 hours, and then dried. The mixed powders were then sintered by hot pressing. The conditions of the hot press for all the mixed powders were the same, and bodies in the form of a mirror (20×20×2 mm) were cut out from the sintered bodies and polished with diamond abrasive powders in a lap to obtain mirror substrates.

The density of the obtained mirror substrates was evaluated using the Archimedes's method and surface roughness was evaluated using TALYSTEP provided by Rank Taylor Hobson Ltd. The determined surface roughness was an average surface roughness Ra. Also, the presence or absence of remaining aluminum compound particles was determined by the presence or absence of black portions in a ×400 magnitude photograph of differential interference contrast (FIG. 3).

The relative strength and density with relation to the content of aluminum oxide is shown in Table 1 and FIG. 1. The solid soluble limit of alumina was 0.62% by weight and that of aluminum was 0.33% by weight.

TABLE 1

| Sample No. | | Composition (wt %) SiC | Al$_2$O$_3$ | Amount as Al | Relative density (%) | Surface roughness (nm) | Remaining Al compound particles |
|---|---|---|---|---|---|---|---|
| Comparative | 1 | 90.00 | 10.00 | 5.29 | 99.9 | 2.8 | Present |
| example | 2 | 95.00 | 5.00 | 2.65 | 99.9 | 3.6 | Present |
| | 3 | 97.00 | 3.00 | 1.59 | 99.9 | 3.4 | Present |
| Example | 4 | 98.50 | 1.50 | 0.79 | 99.9 | 0.9 | Non |
| | 5 | 98.80 | 1.20 | 0.64 | 100.0 | 0.7 | Non |
| | 6 | 99.00 | 1.00 | 0.53 | 100.0 | 0.6 | Non |
| | 7 | 99.20 | 0.80 | 0.42 | 100.0 | 0.8 | Non |
| | 8 | 99.25 | 0.75 | 0.40 | 100.0 | 0.8 | Non |
| | 9 | 99.30 | 0.70 | 0.37 | 99.5 | 1.7 | Non |
| | 10 | 99.32 | 0.68 | 0.36 | 99.7 | 1.1 | Non |
| Solid solution limit as Al = 0.33 wt % | | | | | | | |
| Comparative | 11 | 99.40 | 0.60 | 0.32 | 90.6 | — | Non |
| example | 12 | 99.44 | 0.56 | 0.30 | 89.5 | — | Non |
| | 13 | 99.48 | 0.52 | 0.28 | 85.4 | — | Non |
| | 14 | 99.70 | 0.30 | 0.16 | 83.6 | — | Non |

As seen in FIG. 3, remaining aluminum compound particles were not found in the sintered body of a sample 6 of Example 1 (see the photograph (b)). In contrast, remaining aluminum compound particles were found in the sintered body when the aluminum compound was added in an amount of more than 1% by weight (see the photograph (a)), which produced a rough polished surface. When the amount of the added aluminum compound was less than the solid solution limit, the sintered body had a low density and apparently cannot be applied to a mirror substrate.

Figure 4:
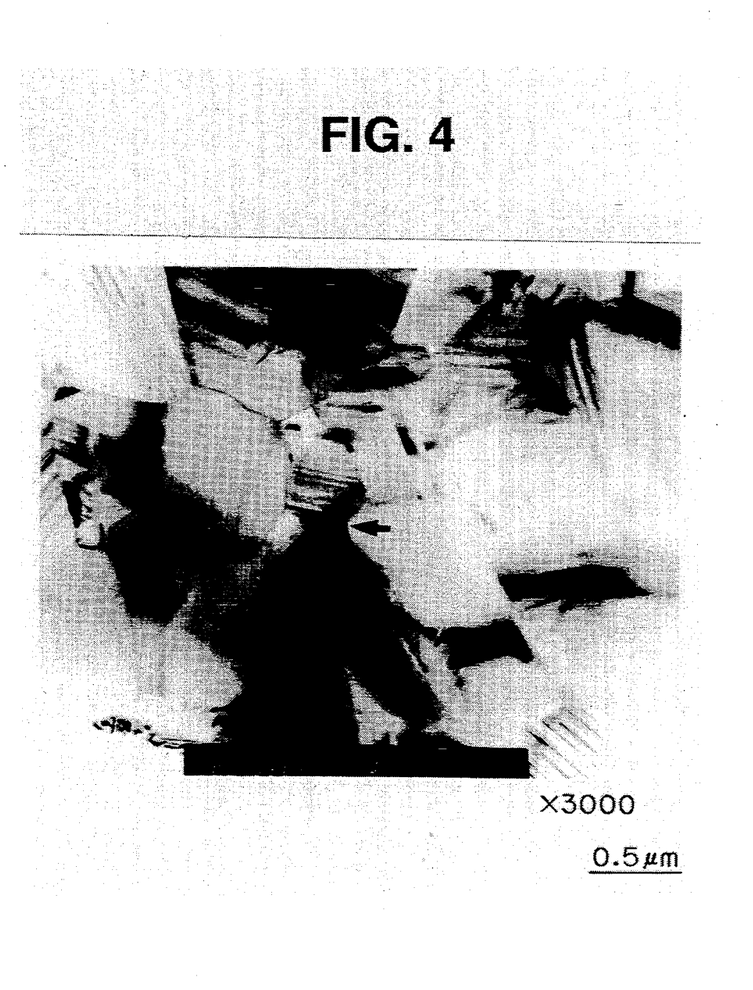
FIG. 4 is the microstructure of a sintered body taken by transmission electron microscopy ($\times 30,000$).
Figure 5:
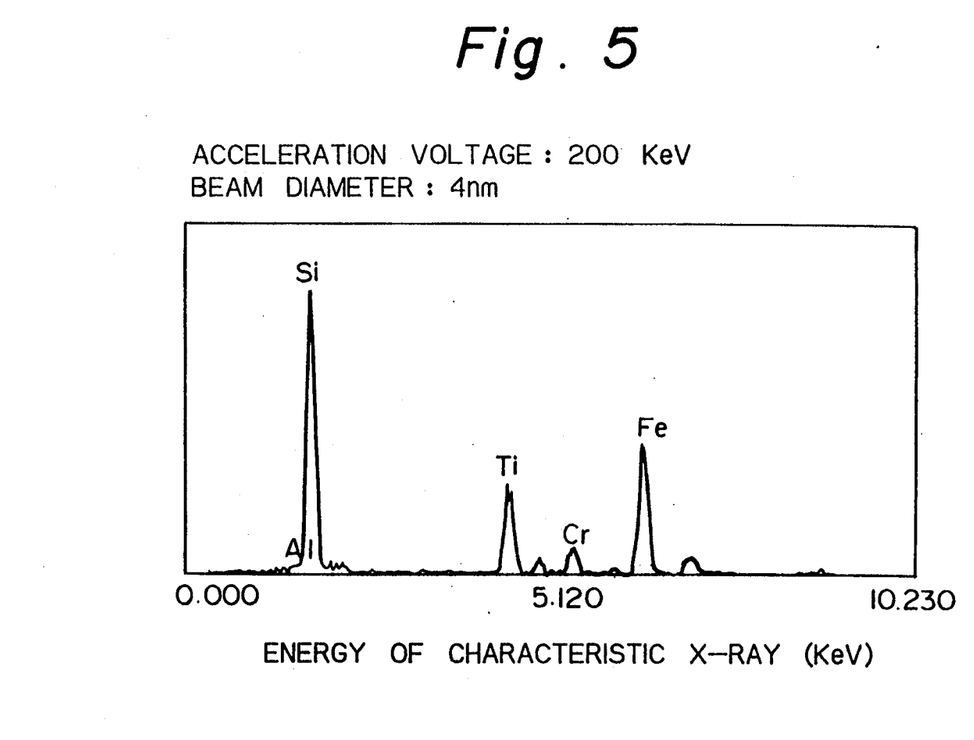
FIG. 5 is the elemental analysis of a triple point of a sintered body.

FIG. 4 shows the sintered body of an Example using a transmission electron microscope at a magnitude of ×30,000. FIG. 5 shows the result of elemental analysis of the triple point appearing in the sintered body by energy dispersion spectroscopy with an acceleration voltage of 200 keV and a beam diameter of 40 Å. The data in FIG. 5 represent an area about 1 μm in diameter since electrons diffuse in the sample.

It is seen from FIGS. 4 and 5 that more aluminum than the aluminum solid soluble in silicon carbide particles exists at the triple point, and the triple point, indicated by the arrow, has a diameter of about 0.1 μm which does not affect the surface roughness when polished.

Further, the following measurements of the properties of the sintered body of Sample No. 7 of Example 1 were taken.

(1) The modules of elasticity was measured by determining the sonic speed in the body by a super sonic wave to be $4.6 \times 10^4$ kg/mm$^2$, indicating a high elastic modulus.

(2) The three point bend test at a temperature in a range of from room temperature to 1500° C. was conducted in accordance with JIS R1601. The bending strength at room temperature was 90 kg/cm$^2$ and the bending strength did not change at temperatures up to 1000° C., indicating high heat stability. Thus, high elastic modulus and high temperature stability, necessary to provide a precise mirror, were attained.

(3) The thermal expansion coefficient was determined by TDA (Termodilatometric analysis) to be about $3.5 \times 10^6$/°C. in a temperature range from room temperature to 200° C., indicating a small thermal expansion coefficient, thereby increasing the precision of the mirror.

(4) The fracture toughness $K_{IC}$ of the body was determined, in accordance with JIS R1607, to be 3.5 MPa m$^{\frac{1}{2}}$, indicating an improvement in toughness and thus easy handling.

(5) The thermal conductivity of the body was measured using the laser flash method and determined to be 120 to 150 W/K.m.

The samples of Example 1 were coated with an aluminum layer by evaporation. The reflections of a laser beam by the coated samples, i.e., the mirrors, were more than about 93%, indicting a high degree of reflection.

Example 2

Silicon carbide powders having an average particle size of 0.15 μm and aluminum oxide powders having an average particle size of 0.3 μm were mixed in compositions as shown in Table 2, and milled in a ball mill of silicon carbide for 24 hours, and then dried. The mixed powders were then sintered by hot pressing. The conditions of the hot press for all the mixed powders were the same and bodies in the form of a mirror (20×20×2 mm) were cut out from the sintered bodies, and polished with diamond abrasive powders in a lap to obtain mirror substrates.

The density of the obtained mirror substrates was evaluated using the Archimedes's method and surface roughness was evaluated using TALYSTEP provided by Rank Taylor Hobson Ltd. The determined surface roughness was an average surface roughness Ra. Also, the presence or absence of remaining aluminum compound particles was determined by the presence or absence of black portions in a ×400 magnitude photograph of differential interference contrast.

In Example 2, the relative strength and density with relation to the content of aluminum oxide is shown in Table 2. The solid soluble limit of alumina was 0.53% by weight and that of aluminum was 0.28% by weight.

As in Example 1, remaining aluminum compound particles were not found in the sintered body of Example 2. In contrast, remaining aluminum compound particles were found in the sintered body when the aluminum compound was added in an amount of more than 1% by weight which produced a rough polished surface. When the amount of the added aluminum compound was less than the solid solution limit, the sintered body had a low density and apparently cannot be applied to a mirror substrate.

TABLE 2

| Sample No. | | Composition (wt %) | | | Relative density (%) | Surface roughness (nm) | Remaining Al compound particles |
| --- | --- | --- | --- | --- | --- | --- | --- |
| | | SiC | Al$_2$O$_3$ | Amount as Al | | | |
| Comparative | 1 | 90.00 | 10.00 | 5.29 | 99.7 | 3.4 | Present |
| example | 2 | 95.00 | 5.00 | 2.65 | 99.8 | 4.1 | Present |
| | 3 | 97.00 | 3.00 | 1.59 | 99.8 | 2.9 | Present |
| Example | 4 | 98.50 | 1.50 | 0.79 | 99.7 | 0.8 | Non |
| | 5 | 98.80 | 1.20 | 0.64 | 99.8 | 0.7 | Non |
| | 6 | 99.00 | 1.00 | 0.53 | 100.0 | 0.5 | Non |
| | 7 | 99.20 | 0.80 | 0.42 | 99.9 | 0.4 | Non |
| | 8 | 99.30 | 0.75 | 0.40 | 100.0 | 0.6 | Non |
| | 9 | 99.30 | 0.70 | 0.37 | 99.9 | 0.7 | Non |
| | 10 | 99.34 | 0.66 | 0.35 | 99.9 | 1.0 | Non |
| | 11 | 99.38 | 0.62 | 0.33 | 99.9 | 0.6 | Non |
| | 12 | 99.42 | 0.58 | 0.31 | 99.5 | 1.5 | Non |
| Solid solution limit as Al = 0.28 wt % | | | | | | | |
| Comparative | 13 | 99.50 | 0.50 | 0.26 | 93.8 | — | Non |
| example | 14 | 99.55 | 0.45 | 0.24 | 91.5 | — | Non |
| | 15 | 99.70 | 0.30 | 0.16 | 89.1 | — | Non |

Example 3

Silicon carbide powders having an average particle size of 0.3 μm and aluminum nitride powders having an average particle size of 0.4 μm were mixed in compositions as shown in Table 1, and milled in a ball mill of silicon carbide for 24 hours, and then dried. The mixed powders were then sintered by hot pressing. The conditions of the hot press for all the mixed powders were the same, and bodies in the form of a mirror (20×20×2 mm) were cut out from the sintered bodies, and polished with diamond abrasive powders in a lap to obtain mirror substrates.

The density of the obtained mirror substrates was evaluated using the Archimedes's method and surface roughness was evaluated using TALYSTEP provided by Rank Taylor Hobson Ltd. The determined surface roughness was an average surface roughness Ra. Also, the presence or absence of remaining aluminum compound particles was determined by the presence or absence of black portions in a ×400 magnitude photograph of differential interference contrast.

In Example 3, the relative strength and density with relation to the content of aluminum nitride is shown in Table 3. The solid soluble limit of aluminum nitride was 0.90% by weight and that of aluminum was 0.59% by weight.

As in Example 1, remaining aluminum compound particles were not found in the sintered body of a sample of Example 3. In contrast, remaining aluminum compound particles were found in the sintered body when the aluminum compound was added in an amount of more than 1% by weight, which produced the rough polished surface. When the amount of the added aluminum compound was less than the solid solution limit, the sintered body had a low density and apparently cannot be applied to a mirror substrate.

TABLE 3

| Sample No. | | Composition (wt %) | | | Relative density (%) | Surface roughness (nm) | Remaining Al compound particles |
|---|---|---|---|---|---|---|---|
| | | SiC | AlN | Amount as Al | | | |
| Comparative | 1 | 95.00 | 5.00 | 3.29 | 99.8 | 2.5 | Present |
| example | 2 | 97.00 | 3.00 | 1.98 | 99.8 | 2.7 | Present |
| Example | 3 | 98.50 | 1.50 | 0.99 | 100.0 | 1.0 | Non |
| | 4 | 98.75 | 1.25 | 0.82 | 100.0 | 0.6 | Non |
| | 5 | 98.90 | 1.10 | 0.72 | 99.9 | 0.7 | Non |
| | 6 | 99.00 | 1.00 | 0.66 | 99.6 | 1.2 | Non |
| Solid solution limit as Al = 0.59 wt % | | | | | | | |
| Comparative | 7 | 99.50 | 0.50 | 0.33 | 85.2 | — | Non |
| example | 8 | 99.75 | 0.25 | 0.17 | 83.2 | — | Non |

We claim:

1. A silicon carbide sintered body, essentially consisting of silicon carbide and aluminum compound, the aluminum compound being present in an amount, as aluminum, of 0.4 to 0.7% by weight of the sintered body, the sintered body having a density of not less than 99.9% of the theoretical density and not containing a particle of the aluminum compound having a particle size of more than 0.2 μm.

2. A silicon carbide sintered body according to claim 1 wherein said sintered body does not contain an aluminum oxide particle having a particle size of more than 0.1 μm.

3. A silicon carbide sintered body according to claim 1 wherein said sintered body has a surface that has an average surface roughness of not more than 2 nm.

4. A silicon carbide sintered body according to claim 3 wherein said average surface roughness is not more than 1 nm.

5. A mirror comprising a silicon carbide sintered body, having a polished surface and a reflecting coating on the polished surface, said sintered body consisting essentially of silicon carbide and aluminum compound, the aluminum compound being present in an amount, as aluminum, of over 0.4% and up to 0.7% by weight of the sintered body, the sintered body having a density of not less than 99.9% of the theoretical density and not containing a particle of the aluminum compound having a particle size of more than 0.2 μm.

6. A mirror comprising a silicon carbide sintered body according to claim 5, wherein said silicon carbide sintered body does not contain an aluminum oxide particle having a particle size of more than 0.1 μm.

7. A mirror comprising a silicon carbide sintered body according to claim 5, wherein said silicon carbide sintered body has a surface that has an average surface roughness of not more than 0.2 μm.

8. A mirror comprising a silicon carbide sintered body according to claim 7, wherein said average surface roughness is not more than 0.1 nm.

9. A process for producing a silicon carbide sintered body according to claim 1, comprising:
  preparing a powder mixture of silicon carbide and aluminum compound, the aluminum compound being in an amount, as aluminum, of over 0.4% and up to 0.7% by weight of the mixture, and
  hot pressing said powder mixture in an inert atmosphere at a temperature in a range of 1800° to 2100° C. at a pressure of not less than 10 MPa to obtain the sintered body.

10. A process according to claim 9 further comprising polishing a surface of said sintered body to provide an average surface roughness of not more than 2 nm to the surface of said sintered body.

* * * * *

UNITED STATES PATENT AND TRADEMARK OFFICE
CERTIFICATE OF CORRECTION

PATENT NO. : 5,407,750
DATED : April 18, 1995
INVENTOR(S) : Toshiya KINOSHITA, et al.

It is certified that error appears in the above-indentified patent and that said Letters Patent is hereby corrected as shown below:

ABSTRACT, line 5, after "aluminum" insert a comma.

ABSTRACT, line 6, after "total" insert --of--.

Column 1, line 67, change "Allingr's" to --Alliegro's--.

Column 2, line 52, change "shows" to --show--.

Column 2, line 54, after "(X400)" insert a period.

Column 4, line 47, change "have" to --has--.

Column 7, line 24, change "(Termodilatometric" to --(Thermodilatometric--.

Column 7, line 54, change "W/K.m." to --W/K·m.--.

Column 9, lines 32 and 33, change "essentially consisting" to --consisting essentially--.

UNITED STATES PATENT AND TRADEMARK OFFICE
CERTIFICATE OF CORRECTION

PATENT NO. : 5,407,750
DATED : April 18, 1995
INVENTOR(S) : Toshiya KINOSHITA, et al.

It is certified that error appears in the above-indentified patent and that said Letters Patent is hereby corrected as shown below:

Column 10, line 31, change "μm" to --nm--.

Signed and Sealed this

Twenty-sixth Day of September, 1995

Attest:

BRUCE LEHMAN

Attesting Officer

Commissioner of Patents and Trademarks